United States Patent
Lee et al.

(10) Patent No.: US 8,771,479 B2
(45) Date of Patent: Jul. 8, 2014

(54) ENERGY-SAVING DISTILLATION COLUMN ASSEMBLY

(75) Inventors: Sung Kyu Lee, Daejeon (KR); Jong Ku Lee, Daejeon (KR); Joon Ho Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 279 days.

(21) Appl. No.: 13/386,003

(22) PCT Filed: Jul. 19, 2010

(86) PCT No.: PCT/KR2010/004704
§ 371 (c)(1),
(2), (4) Date: Jan. 19, 2012

(87) PCT Pub. No.: WO2011/010846
PCT Pub. Date: Jan. 27, 2011

(65) Prior Publication Data
US 2012/0267233 A1 Oct. 25, 2012

(30) Foreign Application Priority Data
Jul. 20, 2009 (KR) .................. 10-2009-0066008

(51) Int. Cl.
*B01D 3/32* (2006.01)
*C10G 7/00* (2006.01)

(52) U.S. Cl.
USPC .............. 203/71; 203/98; 203/99; 208/347; 202/154; 202/158; 202/173

(58) Field of Classification Search
USPC ......... 208/347; 203/71, 98, 99; 202/154, 158, 202/173; 196/139
See application file for complete search history.

(56) References Cited

U.S. PATENT DOCUMENTS

| | | | |
|---|---|---|---|
| 6,846,389 B2 | 1/2005 | Kaibel et al. | |
| 7,169,267 B2 | 1/2007 | Kaibel et al. | |
| 7,528,290 B2* | 5/2009 | Zimmermann et al. | 585/809 |
| 8,092,655 B2* | 1/2012 | Burst et al. | 203/1 |
| 8,246,816 B2* | 8/2012 | Schultz et al. | 208/347 |
| 8,518,245 B2* | 8/2013 | Schultz et al. | 208/347 |
| 8,562,792 B2* | 10/2013 | King et al. | 203/81 |
| 2004/0000473 A1 | 1/2004 | Hofen et al. | |
| 2006/0157336 A1* | 7/2006 | Kaibel et al. | 203/1 |
| 2007/0293688 A1* | 12/2007 | Siegert et al. | 549/368 |

FOREIGN PATENT DOCUMENTS

| | | |
|---|---|---|
| CN | 1427832 A | 7/2003 |
| CN | 1469765 A | 1/2004 |
| DE | 10019196 C1 | 9/2001 |

(Continued)

*Primary Examiner* — Nina Bhat
(74) *Attorney, Agent, or Firm* — McKenna Long & Aldridge LLP

(57) ABSTRACT

Provided is a distillation column assembly combining two distillation columns used in a distillation process. The distillation column assembly is characterized in that a dividing wall column (DWC) that has one inflow point, three outflow points and an internal dividing wall and a typical distillation column that has two inflow points and two outflow points are sequentially connected to each other, and in that streams of the two outflow points of the DWC are introduced into the two inflow points of the typical distillation column. The distillation column assembly improves an existing process apparatus based on two distillation columns, so that it can be easily installed, has a high energy-saving effect, and can be applied to the case where a separation pressure difference and a utility temperature difference are great.

6 Claims, 6 Drawing Sheets

(56) References Cited

FOREIGN PATENT DOCUMENTS

| | | |
|---|---|---|
| JP | 11-347301 A | 12/1999 |
| JP | 2001-348222 A | 12/2001 |
| JP | 2003-532720 A | 11/2003 |
| JP | 2004-508923 A | 3/2004 |
| JP | 2005-535725 A | 11/2005 |
| WO | 01/79381 A1 | 10/2001 |
| WO | 2008/147634 A1 | 12/2008 |
| WO | WO 2009/000634 A1 | 12/2008 |

\* cited by examiner

ENERGY-SAVING DISTILLATION COLUMN ASSEMBLY

CROSS-REFERENCE TO RELATED APPLICATION

This application is a National Stage Entry of International Application no. PCT/KR2010/004704, filed Jul. 19, 2010, and claims priority to and the benefit of Korean Patent Application No. 10-2009-0066008, filed Jul. 20, 2009, which are hereby incorporated by reference for all purposes as if fully set forth herein.

BACKGROUND

1. Field of the Invention

The present invention relates to a distillation column assembly combining two distillation columns used in a distillation process.

2. Discussion of Related Art

A variety of raw materials such as crude oil are usually composed of a mixture of many compounds. These raw materials are rarely used by themselves industrially, but are usually used after being separated into respective compounds. A representative chemical process for separating the mixtures is a distillation process.

The distillation process typically involves dividing the mixture into two components: a high boiling-point component and a low boiling-point component, and thus uses distillation columns of a number (n−1) that is one less than the number (n) of components of a mixture to be separated. That is, to separate a three-component mixture in the typical distillation industrial field, at least two distillation columns must be used. Most practical processes also use a serial structure of two distillation columns.

The typical distillation process of separating the three-component mixture is as shown in FIG. 1.

This process is a dual column method of separating a lowest boiling-point component D in a first column 11 and separating an intermediate boiling-point component S and a high boiling-point component B in a second column 21. In such a method, a phenomenon in which the intermediate boiling-point component S is again mixed at a lower zone of the first column generally occurs.

The process of separating the three-component mixture using two serial columns is disclosed in Korean Patent Application Publication No. 10-2003-0088211 (KR 10-2003-0088211), which was published on Nov. 19, 2003, by way of example. This patent document discloses a method of operating two distillation columns to refine normal butanol. The related art can refer to this method, and the disclosure of KR 10-2003-0088211 is incorporated by reference herein in its entirety.

In the aforementioned process, while the composition of a product can be easily controlled, a remixing process of the intermediate boiling-point material takes place in the first distillation column. This acts as a main factor of reducing thermodynamic efficiency in the distillation column, thus resulting in additional unnecessary consumption of energy.

To improve limitations of this distillation column, there has been a proposal for a dividing wall column (DWC). The DWC has a structure in which a preliminary separator is integrated with a main separator in a main column by installing a dividing wall in the main column. The DWC having this structure has a great advantage in that two distillation columns are integrated into one distillation column, so that investment expenses can be remarkably saved. That is, since the two distillation columns are integrated into one distillation column using the dividing wall, the DWC fundamentally eliminates a problem of reduction in energy efficiency due to remixing of the intermediate boiling-point component which occurs when two typical distillation columns are used. In general, the DWC has been known to have an energy saving effect of about 30% (maximum 60%) and an investment expense saving effect of 20% to 30% in comparison with the typical distillation column. Since the DWC requires a small space and has a high effect of improving yield/purity, the DWC is frequently applied to new distillation columns as well as for revamping existing distillation columns. The DWC can be applied to separation of any three or more component systems if a separation pressure difference and a utility temperature difference are not very great. As such, the DWC has very wide technical applications.

Particularly, the DWC shows excellent improvement in performance under the following conditions: (1) when there is relatively much of the intermediate boiling-point component, (2) when high-purity separation of the intermediate boiling-point component is required, and (3) when product standard and relative volatility distributions are uniform. An internal structure design for a dividing wall section for separating main and preliminary distillation parts, prediction of heat transfer characteristics and the height equivalent to a theoretical plate (HETP) in the dividing wall section, computer simulation technology for predicting separation characteristics, securing of operation and control performance, etc. are important technical issues.

The distillation process requires 19% of the total consumption of energy of Korean industries and 11% of the total consumption of national energy. This is a tremendous amount corresponding to 16,700,000 TOE of the amount of energy used and 14,600,000 TC (based on heavy oil) of the amount of $CO_2$ emission. Petrochemical industries require 24% of the amount of total consumption of Korean national energy ($16.4 \times 10^7$ TOE based on 2003). 50% of the total consumption of energy of the petrochemical industries is caused by a separating process, and 85% of the total consumption of energy of the separating process is caused by a distillation process.

The distillation process is such a representative energy-intensive process as to require 5.4% of the total consumption of national energy in the case of the United States and 13% of the total consumption of national energy in the case of the United Kingdom.

Energy expense in the petrochemical industries amounts to about 7% over the sales and greatly exceeds a range of 2% to 4% that is a mean profit rate of the corresponding industries, thus becoming a considerable burden on business administration. Further, countries worldwide have signed the Framework Convention on Climate Change, and carbon emission rights of each country have become an issue. Therefore, a problem with energy expense saving is directly associated with a problem with reduction in $CO_2$ emission.

In this situation, the necessity to develop energy-saving technology in the distillation process is very high. Despite the urgent need to save energy, the introduction of a new process is very difficult due to high facility investment expenses, compared to other fields. That is, since the distillation process is a process industry whose facility expenses are very high, it is difficult to derive economic feasibility to introduce the distillation process even when a new energy-saving apparatus is developed. In this respect, the best measure is merely to optimize a method of operating a previously installed apparatus in the related art.

For this reason, it is very urgent to develop an energy-saving distillation apparatus capable of readily, economically replacing an existing apparatus.

As described above, the DWC has a comparative advantage in terms of the energy-saving effect and the facility investment-saving effect compared to existing typical distillation columns. Thus, it is possible to obtain a desired energy-saving effect by replacing the existing typical distillation column with the DWC.

However, even when the separating processes for all kinds of chemicals are simply replaced with the DWC, energy is not actually saved. Particularly, when the separation pressure difference and the utility temperature difference are great, the energy-saving effect of the DWC may be extremely slight, or an adverse effect may actually occur.

In summary, the energy-saving distillation apparatus capable of replacing the existing distillation apparatus has to meet the following requirements: (1) a high energy-saving effect, (2) a possibility of economically replacing the existing process without a great change, (3) applicability even when the separation pressure difference and the utility temperature difference are great, and so on.

SUMMARY OF THE INVENTION

Accordingly, the present applicant intends to propose a new distillation column assembly by properly combining an arrangement sequence, a stream, etc. of a DWC and a typical distillation column. The distillation column assembly improves an existing process apparatus based on two distillation columns, and thus has advantages in that it can be easily installed, in that it has a high energy-saving effect, and in that it can be applied to the case where a separation pressure difference and a utility temperature difference are great.

An aspect of the present invention provides a distillation column assembly, which is characterized in that: a dividing wall column (DWC) that has one inflow point, three outflow points and an internal dividing wall and a typical distillation column that has two inflow points and two outflow points are sequentially connected to each other; and streams of the two outflow points of the DWC are introduced into the two inflow points of the typical distillation column.

In the distillation column assembly, the two streams introduced from the DWC into the typical distillation column may be an intermediate boiling-point stream and a high boiling-point stream, respectively.

In the distillation column assembly, the two streams introduced from the DWC into the typical distillation column may be an intermediate boiling-point stream and a low boiling-point stream, respectively.

Another aspect of the present invention provides a method of supplying a mixture of three or more components to the distillation column assembly, and assorting and distilling the mixture into three distillates.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

The present invention is directed to a distillation column assembly, which is characterized in that:

a dividing wall column (DWC) that has a single inflow point, three outflow points and an internal dividing wall and a typical distillation column that has two inflow points and two outflow points are sequentially connected to each other; and streams of the two outflow points of the DWC are introduced into the two inflow points of the typical distillation column.

In the present invention, the DWC has the single inflow point and the three outflow points.

Figure 2:
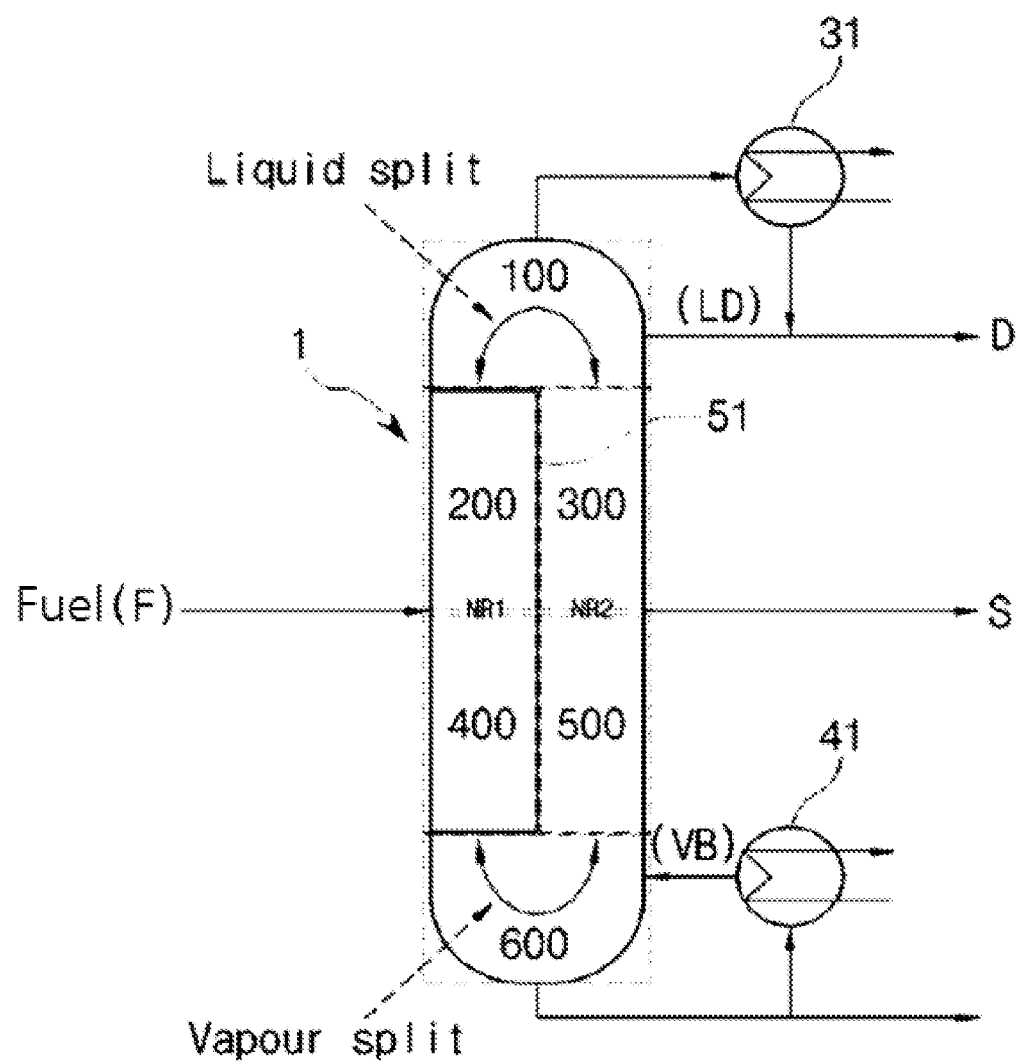
FIG. 2 shows a structure of a dividing wall column (DWC), which is one component of the present invention.

A structure of the DWC, which is one component of the present invention, is shown in FIG. 2.

The DWC may be generally divided into six zones as follows.

A column top zone 100 refers to an upper area of a main column with no dividing wall.

An upper supply zone 200 refers to a sub-area whose one face is partitioned by the dividing wall and which is located above an inflow material (raw material) stream.

An upper outflow zone 300 refers to a sub-area whose one face is partitioned by the dividing wall and which is located above an outflow material stream.

A lower supply zone 400 refers to a sub-area whose one face is partitioned by the dividing wall and which is located below the inflow material stream.

A lower outflow zone 500 refers to a sub-area whose one face is partitioned by the dividing wall and which is located below the outflow material stream.

A column bottom zone 600 refers to a lower area of a main column with no dividing wall.

Mixture fuel F of three or more components flows into a middle stage NR1 where the upper supply zone is in contact with the lower supply zone. Among the components, a low boiling-point component D flows out of the column top zone, a high boiling-point component B flows out of the column bottom zone, and an intermediate boiling-point component S flows out of a middle stage NR2 where the upper outflow zone is in contact with the lower outflow zone.

As described above, one mixture fuel inflow point stream, and three outflow point streams including a low boiling-point component stream, an intermediate boiling-point component stream, and a high boiling-point component stream are present.

A conventional DWC may be used as the DWC with no restriction. This conventional DWC is not described because it is apparent to the person having ordinary skill in the art (hereinafter, abbreviated to "PHOSITA"). If necessary, the conventional DWC may refer to that disclosed in Korean Patent Application Publication No. 10-2008-0129049 (KR 10-2008-0129049), which was filed with the Korean Intellectual Property Office (KIPO) on Dec. 18, 2008 by the present applicant, and the disclosure of which is incorporated by reference herein in its entirety.

Figure 1:
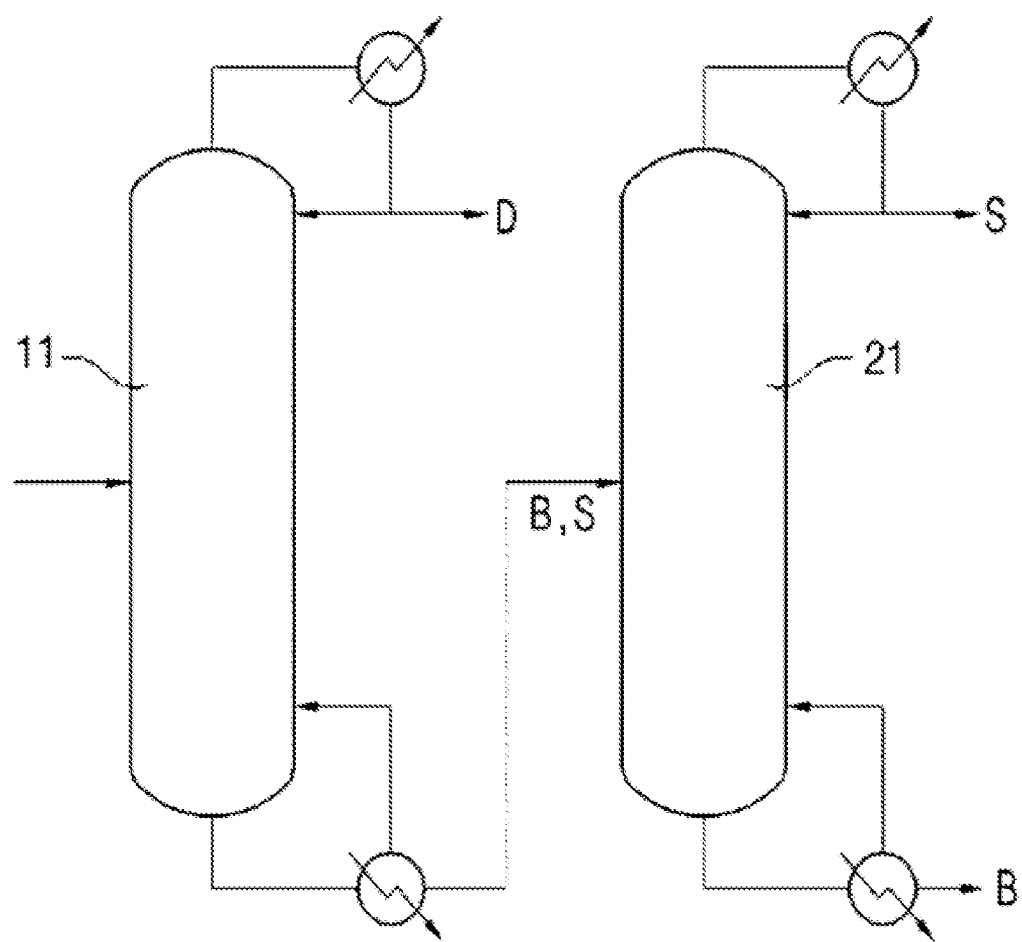
FIG. 1 shows a conventional distillation process of separating a mixture of three or more components.

In the present invention, the typical distillation column has the two inflow points and the two outflow points. As shown in FIG. 1, a conventional typical distillation column that has been widely used has one inflow point and two outflow points. However, the typical distillation column of the present invention is different from the conventional typical distillation column in that it is improved so as to have the two inflow points and the two outflow points. In this respect, it will be understood that the term "typical distillation column" is intended to indicate a distillation column that is not equal to the conventional typical distillation column but is different from the DWC.

In the present invention, the DWC and the typical distillation column are sequentially connected, and the two outflow point streams arbitrarily selected from the three outflow point streams of the DWC are introduced into the two inflow points of the typical distillation column.

Since the two outflow point streams are arbitrarily selected from the three outflow point streams, there are three cases including a case (first case) where the low boiling-point stream and the intermediate boiling-point stream are introduced into the typical distillation column, a case (second case) where the low boiling-point stream and the high boiling-point stream are introduced into the typical distillation column, and a case (third case) where the intermediate boiling-point stream and the high boiling-point stream are introduced into the typical distillation column.

Particularly, the two outflow point streams introduced into the typical distillation column may be properly selected by the PHOSITA in consideration of relative volatility distribution, and so on. In detail, when a volatility difference between a low boiling-point material and the other materials is very great, the intermediate and high boiling-point streams other than the low boiling-point stream are preferably introduced into the typical distillation column. When a volatility difference between a high boiling-point material and the other materials is very great, the low and intermediate boiling-point streams other than the high boiling-point stream are preferably introduced into the typical distillation column.

The two streams introduced from the DWC into the typical distillation column are individually introduced into the typical distillation column without being mixed with each other. If the two inflow point streams are again mixed with each other, additional energy is consumed to separate the mixed streams. For this reason, this mixture is not preferable.

Further, the two streams introduced from the DWC into the typical distillation column may be introduced into proper stages respectively by the PHOSITA comparing and determining a mixture concentration of each stream with a mixture concentration in the typical distillation column. In other words, the distillation column operated in a steady state has constant mixture concentration distribution according to a position of each stage. This can be considered in deciding the position of the stage into which each stream is introduced. From the thermodynamic viewpoint, the concentration of the introduced stream is preferably similar to the concentration at the position of the state into which the stream is introduced.

Particularly, in the distillation column, the mixture concentration distribution according to the stage position is again influenced by the position of the stage at which a material is to be distilled. As such, the PHOSITA may decide this stage position using a trial and error method.

Further, the present invention is directed to a method of supplying a mixture of three or more components to the distillation column assembly and assorting and distilling the mixture into three distillates.

The present invention will be described below in greater detail by reference to embodiments. The embodiments of the present invention are merely for detailed description of the present invention, and are not intended to limit the protective scope of the present invention.

Embodiment 1 and Comparative Example 1: Example of Direct Sequence

A performance test of distillation columns was carried out by replacing a conventional process (Comparative Example 1) of separating a low boiling-point component in a first column first and re-separating the other components, i.e. the intermediate and high boiling-point components, in a second column with the distillation column assembly (Embodiment 1) of the present invention.

The conventional process was allowed to be simply modified only by installing a dividing wall in the first column and adding one introduction pipe to the second column.

Figure 3:
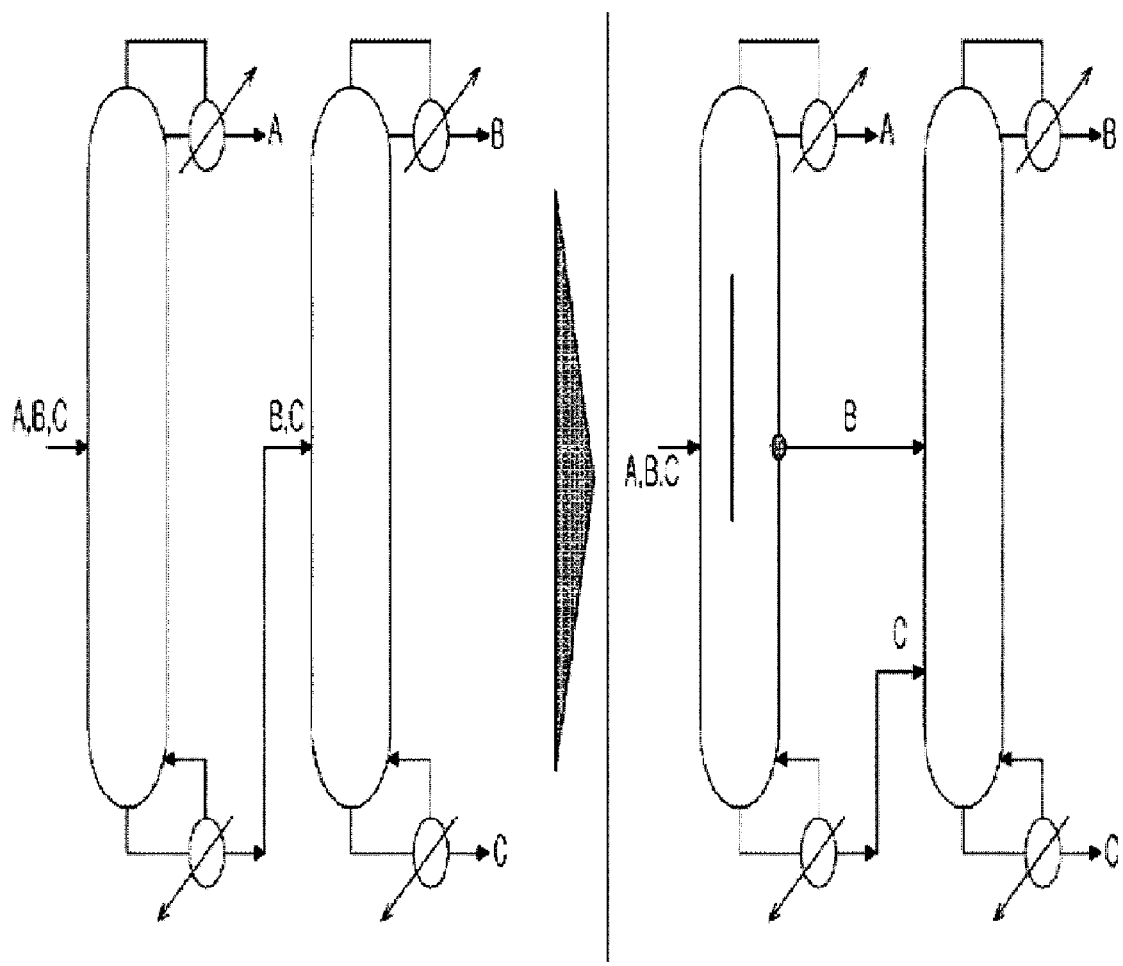
FIG. 3 shows concepts of Embodiment 1 of the present invention and Comparative Example 1.

Concepts of Embodiment 1 of the present invention and Comparative Example 1 are shown in FIG. 3.

Figure 5:
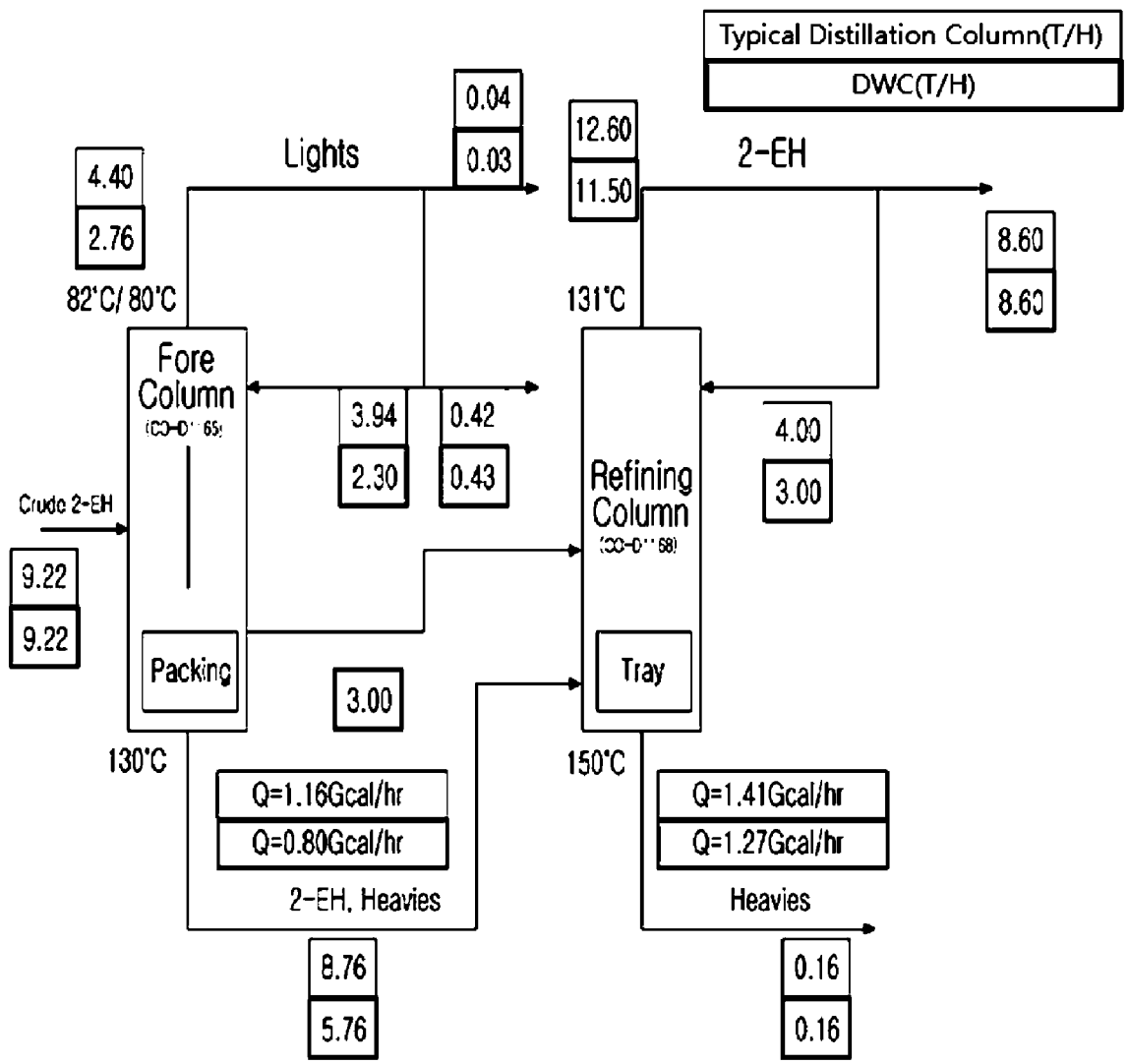
FIG. 5 shows the results of Embodiment 1 of the present invention and Comparative Example 1.

In the process, crude 2-ethylhexanol (2-EH) was used as a material to be distilled, and the distilled 2-EH represented a high-purity content of 99 wt % in both Embodiment 1 and Comparative Example 1. The results were as shown in FIG. 5. A unit of each mass flow rate is ton/hr.

An amount of energy consumption is shown in Table 1 below.

TABLE 1

| Amount of Energy Consumption (MMKcal/hr) | | Energy-Saving Amount (MMKcal/hr) | Energy-Saving Rate (%) |
|---|---|---|---|
| Com. Exp. 1 | Embodiment 1 | | |
| 2.57 | 2.07 | 0.50 | 19.5 |

Embodiment 2 and Comparative Example 2: Example of Indirect Sequence

A performance test of distillation columns was carried out by replacing a conventional process (Comparative Example 2) of separating a high boiling-point component in a first column first and re-separating the other components, i.e. the low and intermediate boiling-point components, in a second column with the distillation column assembly (Embodiment 2) of the present invention.

The conventional process was allowed to be simply modified only by installing a dividing wall in the first column and adding one introduction pipe to the second column.

Figure 4:
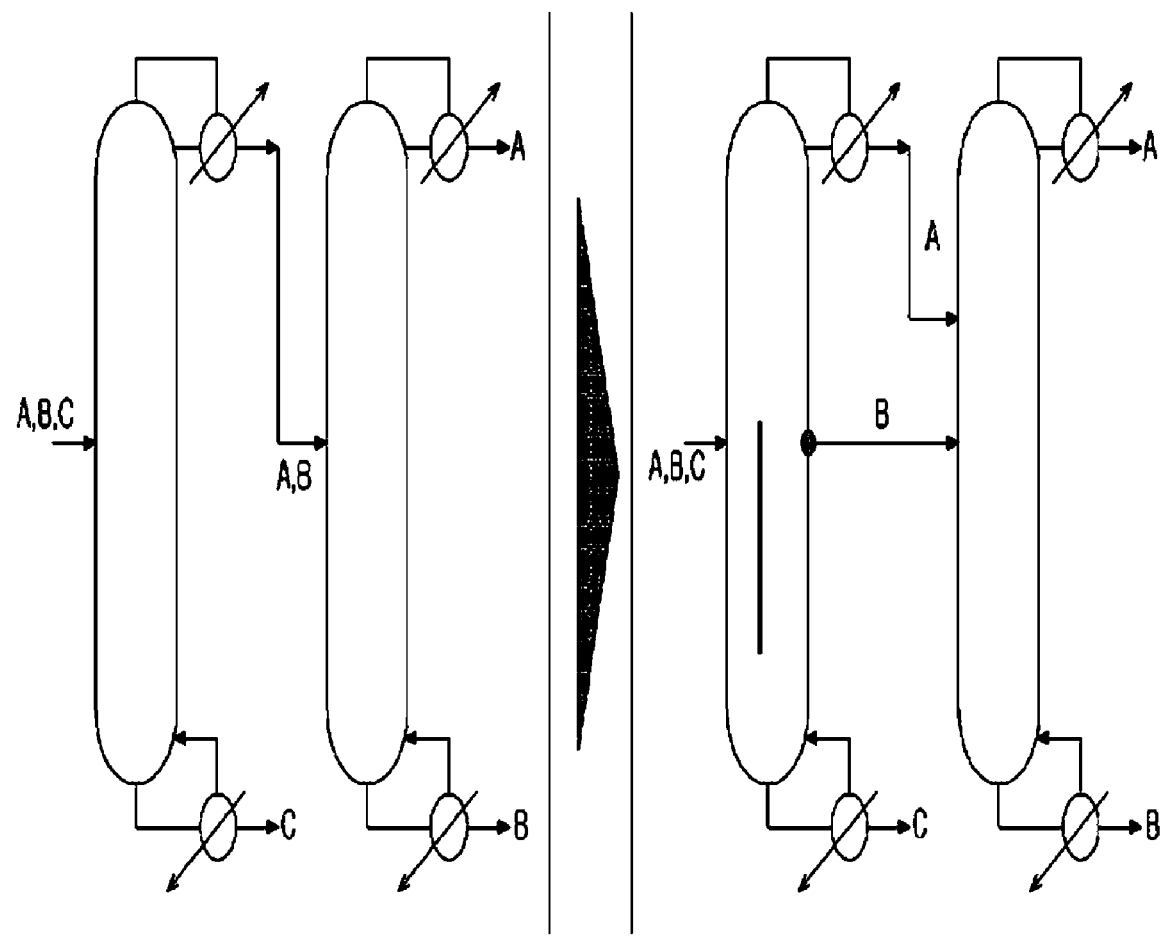
FIG. 4 shows concepts of Embodiment 2 of the present invention and Comparative Example 2.

Concepts of Embodiment 2 of the present invention and Comparative Example 2 are shown in FIG. 4.

Figure 6:
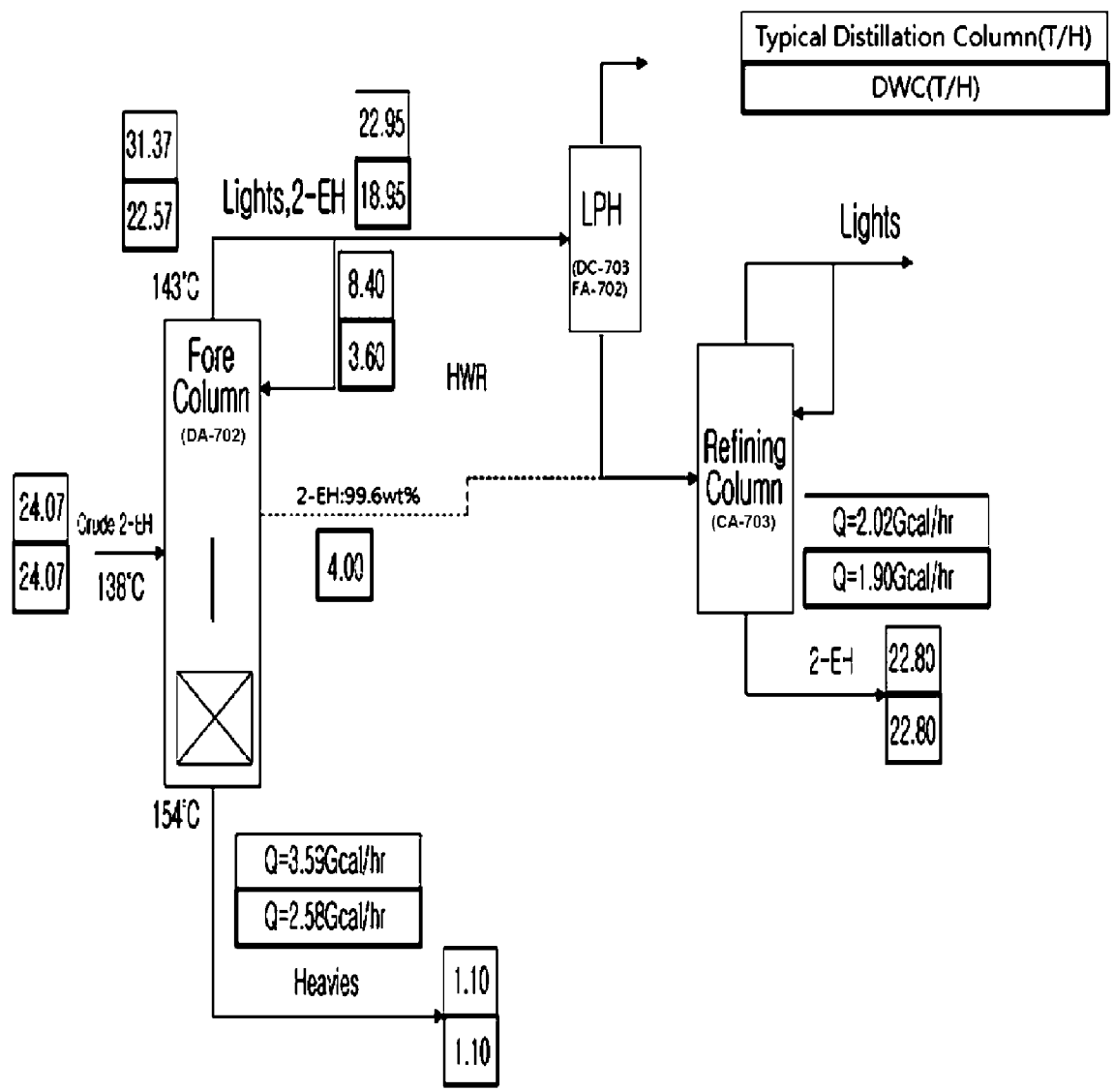
FIG. 6 shows the results of Embodiment 2 of the present invention and Comparative Example 2.

In the process, crude 2-EH was used as a material to be distilled, and the distilled 2-EH represented a high-purity content of 99 wt % in both Embodiment 2 and Comparative Example 2. The results were as shown in FIG. 6. A unit of each mass flow rate is ton/hr.

An amount of energy consumption is shown in Table 2 below.

TABLE 2

| Amount of Energy Consumption (MMKcal/hr) | | Energy-Saving Amount (MMKcal/hr) | Energy-Saving Rate (%) |
|---|---|---|---|
| Com. Exp. 1 | Embodiment 1 | | |
| 5.61 | 4.48 | 1.13 | 20.1 |

Although the energy-saving amount shows somewhat of a difference according to whether the direct sequence type or the indirect sequence type is used, it can be seen from Tables 1 and 2 that the energy-saving rate is improved by replacing the conventional process with the distillation column assembly of the present invention.

According to the present invention, the distillation column assembly improves an existing process apparatus based on two distillation columns, so that it can be easily installed, has a high energy-saving effect, and can be applied to the case where a separation pressure difference and a utility temperature difference are great.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A distillation column assembly, characterized in that:
a dividing wall column (DWC) that has one inflow point, three outflow points and an internal dividing wall and a typical distillation column that has two inflow points and two outflow points are sequentially connected to each other; and
streams of the two outflow points of the DWC are individually introduced into the two inflow points of the typical distillation column without being mixed with each other, wherein,
in the case of a direct sequence, the two streams introduced from the DWC into the typical distillation column are an intermediate boiling-point stream and a high boiling-point stream, respectively, and
in the case of an indirect sequence, the two streams introduced from the DWC into the typical distillation column are the intermediate boiling-point stream and a low boiling-point stream, respectively.

2. The distillation column assembly of claim 1,
wherein, the distillation column assembly comprises:
the DWC, wherein the two streams introduced from the DWC into the typical distillation column are an intermediate boiling-point stream and a high boiling-point stream, respectively; and
the typical distillation column connected to the DWC,
wherein the DWC comprises:
a single inflow point supplying a mixture of three or more components;
a first outflow point at which the high boiling-point component included in the mixture flows out;
a second outflow point at which the middle boiling-point component included in the mixture flows out;
a third outflow point at which the low boiling-point component included in the mixture flows out; and
a dividing wall that is disposed in the DWC,
wherein the typical distillation column comprises:
the first inflow point; and
the second inflow point and the two outflow points which are disposed below the first outflow point, and
wherein the first outflow point of the DWC connects to the first outflow point of the typical distillation column, and the second outflow point of the DWC connects to the second outflow point of the typical distillation column.

3. The distillation column assembly of claim 1,
wherein the distillation column assembly comprises:
the DWC, wherein the two streams introduced from the DWC into the typical distillation column are an intermediate boiling-point stream and a low boiling-point stream, respectively; and
the typical distillation column connected to the DWC,
wherein the DWC comprises:
a single inflow point supplying a mixture of three or more components;
a first outflow point at which the high boiling-point component included in the mixture flows out;
a second outflow point at which the middle boiling-point component included in the mixture flows out;
a third outflow point at which the low boiling-point component included in the mixture flows out; and
a dividing wall that is disposed in the DWC,
wherein the typical distillation column comprises:
the first inflow point; and
the second inflow point and the two outflow points which are disposed below the first outflow point, and
wherein the first outflow point of the DWC connects to the first outflow point of the typical distillation column, and the third outflow point of the DWC connects to the second outflow point of the typical distillation column.

4. A method comprising:
supplying a mixture of three or more components to the distillation column assembly of claim 1, and
assorting and distilling the mixture into three distillates.

5. A method comprising:
supplying a mixture of three or more components to the distillation column assembly of claim 2, and
assorting and distilling the mixture into three distillates.

6. A method comprising:
supplying a mixture of three or more components to the distillation column assembly of claim 3, and
assorting and distilling the mixture into three distillates.

* * * * *